(12) United States Patent
Kerschbaum et al.

(10) Patent No.: US 8,130,947 B2
(45) Date of Patent: Mar. 6, 2012

(54) PRIVACY PRESERVING SOCIAL NETWORK ANALYSIS

(75) Inventors: Florian Kerschbaum, Karlsruhe (DE); Andreas Schaad, Karlsruhe (DE)

(73) Assignee: SAP AG, Walldorf (DE)

( * ) Notice: Subject to any disclaimer, the term of this patent is extended or adjusted under 35 U.S.C. 154(b) by 759 days.

(21) Appl. No.: 12/173,829

(22) Filed: Jul. 16, 2008

(65) Prior Publication Data

US 2010/0014657 A1    Jan. 21, 2010

(51) Int. Cl.
*H04K 1/00* (2006.01)

(52) U.S. Cl. ............. 380/28; 380/1; 380/255; 380/285; 726/2; 726/3; 726/4; 726/5; 726/26; 713/150; 713/168; 713/170; 713/182; 705/67

(58) Field of Classification Search ............... 380/1, 28, 380/255, 285, 280; 726/2–5, 26; 713/150, 713/168, 170, 182; 705/67
See application file for complete search history.

(56) References Cited

U.S. PATENT DOCUMENTS

| | | | | |
|---|---|---|---|---|
| 4,926,479 A * | 5/1990 | Goldwasser et al. | ......... | 713/180 |
| 5,838,794 A * | 11/1998 | Mittenthal | ....... | 380/28 |
| 6,823,068 B1 * | 11/2004 | Samid | ............ | 380/28 |
| 7,236,590 B2 * | 6/2007 | Perkins et al. | .......... | 380/30 |
| 7,454,400 B2 * | 11/2008 | Andreoli et al. | ........... | 706/62 |
| 7,467,399 B2 * | 12/2008 | Nadalin et al. | ............ | 726/2 |
| 7,599,935 B2 * | 10/2009 | La Rotonda et al. | ........... | 1/1 |
| 7,669,123 B2 * | 2/2010 | Zuckerberg et al. | ......... | 715/273 |
| 7,698,380 B1 * | 4/2010 | Amidon et al. | ............ | 709/218 |
| 7,716,140 B1 * | 5/2010 | Nielsen et al. | ........... | 705/319 |
| 7,801,307 B2 * | 9/2010 | Bantwal | ............ | 380/260 |
| 7,853,018 B2 * | 12/2010 | Atallah et al. | .......... | 380/277 |
| 2004/0101191 A1 * | 5/2004 | Seul et al. | ............. | 382/151 |
| 2004/0148275 A1 * | 7/2004 | Achlioptas | ............ | 707/3 |
| 2009/0216820 A1 * | 8/2009 | Eusterbrock | ........... | 708/270 |

FOREIGN PATENT DOCUMENTS

WO    WO 2005043808 A1 *   5/2005

\* cited by examiner

*Primary Examiner* — April Shan (57) ABSTRACT

A method and a system for privacy-preserving SNA. A plurality of vertices of a first subgraph of a graph is encrypted with a first key of a commutatively encryption scheme. A plurality of vertices of a second subgraph encrypted with a second key of the commutatively encryption scheme are received and encrypted commutatively with the first key. A plurality of commutatively encrypted vertices of the first subgraph and a plurality of commutatively encrypted vertices of the second subgraph are used for computing centrality metrics preserving the privacy of the graph and its structure.

20 Claims, 5 Drawing Sheets

PRIVACY PRESERVING SOCIAL NETWORK ANALYSIS

FIELD OF INVENTION

The field of invention relates generally to electronic data processing and more particularly to secure computing.

BACKGROUND

A social network is a social structure made of individuals or organizations that are tied by one or more specific types of interdependencies. The resulting structures are often very complex. Social network analysis (SNA) views a social network in terms of a graph with vertices and edges. Vertices are the individual actors within the network, which are generally individuals and organizations. Edges are the relationships between the individual actors, such as values, visions, ideas, financial exchange, friends, kinship, dislike, conflict, trade, web links, business relations, disease transmission, airline routes, etc. SNA is regarded as a powerful tool for determining a variety of social properties of the graph.

SNA is especially useful when applied for social networks spread across multiple sources such us countries, social groups, companies, departments, buildings, etc. The more information from the multiple sources for a distributed social network that can be gathered, the better the SNA results. However, the collection of information for a distributed social network might be restricted by privacy requirements, or enforces data governance policies. An example for such requirements is the variety of privacy protection laws, adopted in most countries and in many international organizations worldwide. Furthermore, virtually all large organizations follow strict internal rules for personal data protection regarding customers, partners, employees, etc. In order to analyze and determine the properties of such networks, what is required is privacy-preserving SNA to protect personally identifiable data from the multiple sources.

SUMMARY

A method and a system for privacy-preserving SNA are described. A plurality of vertices of a first subgraph of a graph is encrypted with a first key of a commutatively encryption scheme. A plurality of vertices of a second subgraph encrypted with a second key of the commutatively encryption scheme are received and encrypted commutatively with the first key. A plurality of commutatively encrypted vertices of the first subgraph and a plurality of commutatively encrypted vertices of the second subgraph are used for computing centrality metrics preserving the privacy of the graph and its structure.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

DETAILED DESCRIPTION

Embodiments of a method and a system for providing privacy-preserving SNA of a social network distributed over multiple entities are described herein.

One embodiment of the invention computes important centrality metrics such as "betweenness" and "closeness" for a social network distributed among a plurality of sources, without revealing personally identifiable information. This allows a party to rank a selected vertex or a person of interest against the entire social network without revealing privacy data for the rest of the network.

In order to preserve privacy, the vertices of the social network graph are encrypted applying a commutative encryption scheme. In such a scheme, an object could be encrypted with a plurality of different keys and order of encryption does not matter. The commutative encryption scheme holds that $E_1(E_2(x))=E_2(E_1(x))$, where $E_1()$ denotes a commutative encryption with a first key, $E_2()$ denotes commutative encryption with a second key, and x is a plain object, value or text to be encrypted. The commutative encryption cannot be semantically secure, as the encrypted objects are comparable.

Another embodiment of the invention applies a homomorphic threshold encryption scheme for encrypting vertices or other values in a social network. The homomorphic property of an encryption scheme allows operations with the plain texts or values. It holds that $E^*(x)*E^*(y)=E^*(x+y)$, where $E^*()$ denotes homomorphic encryption, and x and y are plain texts or values. From this equation, by means of simple arithmetic operations is concluded that the homomorphic encryption scheme further holds that $E^*(x)^y=E^*(xy)$.

The homomorphicaly encrypted texts are semantically secure, e.g. the cipher text reveals nothing about the plain text. This implies an important property of re-randomization. According to this property, when an input encrypted text is modified, it cannot be linked to its original source without modifying the plain text. In one embodiment of the invention, randomization is performed by "adding 0": $E^*(x)*E^*(0)=\hat{E}^*(x)$, where $\hat{E}^*(x)$ is a homomorphic encryption of the same plane text x. $E^*(x)$ and $\hat{E}^*(x)$ are not comparable and cannot be linked until both are decrypted with the decryption key.

In a threshold encryption scheme, the decryption key is replaced by a distributed protocol. In order to decrypt an encrypted text, a number of parties exceeding a given threshold is required to cooperate in the decryption protocol. The text is encrypted using a public key and the corresponding private key is shared among the participating parties.

As used herein, the terms "plain text" and "plain value", or simply "text" and "value" mean an object, a message, or a value that is not encrypted. The terms "cipher text" and "cipher value" mean an encrypted object. As used in this document, an encryption scheme refers to a suit of algorithms, implemented in a cryptosystem to perform a particular type of encryption and decryption. As used herein, the term "graph" refers to a social network, the term "vertex" refers to an individual or other artifact, such as telephone number or company etc., within a social network. Depending on the context, the term "vertex" also means the identifying information of an individual or other artifact. The term "edge" refers to a relationship between a pair of individuals or other artifacts in a social network. Herein, a graph is distributed among a plurality of parties and each party holds a subgraph of the entire graph. The subgraphs may overlap. As used herein, the term "process" means a sequence of related activities carried out to achieve a specific purpose.

Figure 1:
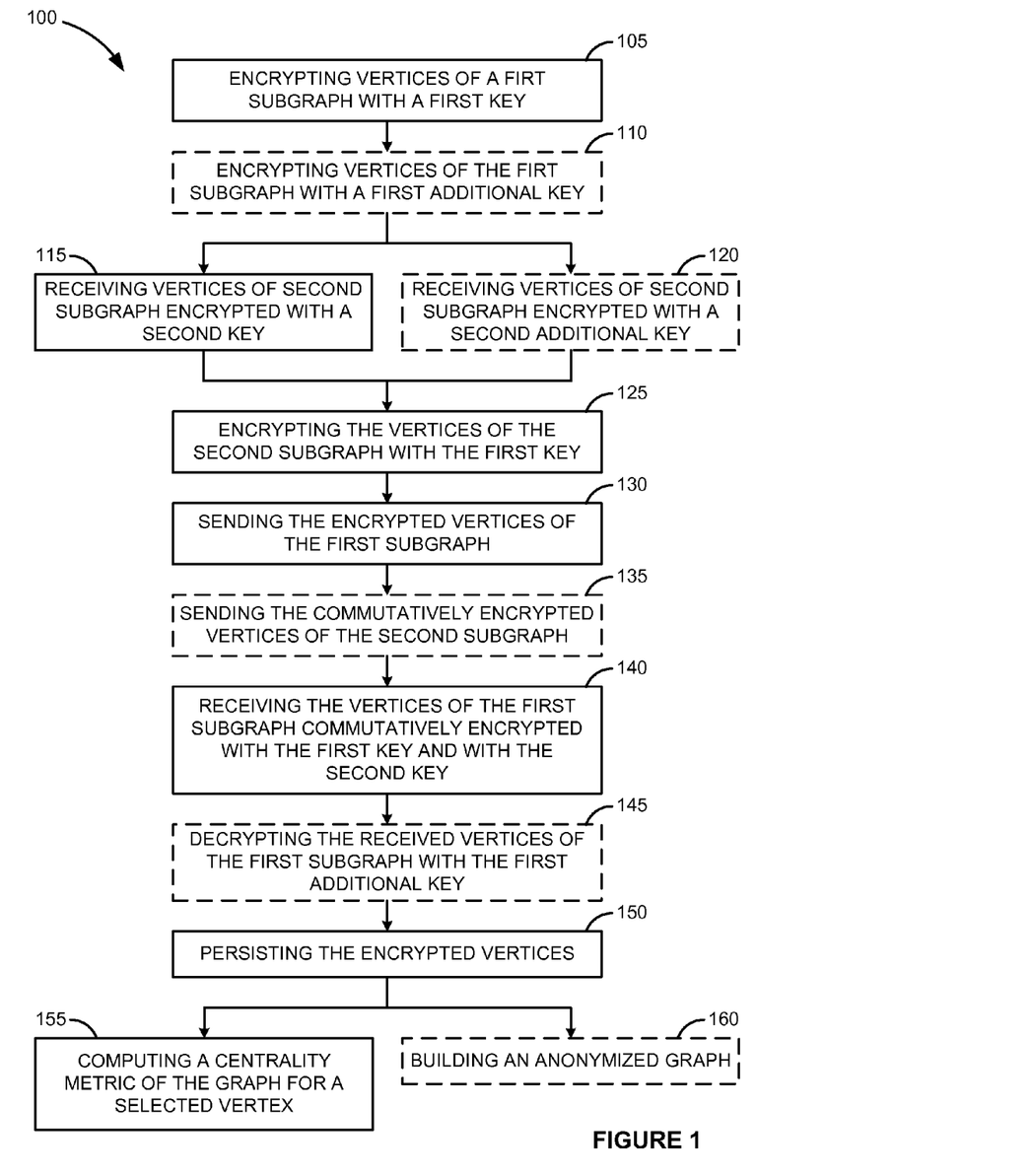
FIG. 1 illustrates a flowchart of a process to encrypt the vertices of a distributed graph in order to compute centrality metrics while preserving privacy according to one embodiment of the invention.

FIG. 1 is a flowchart 100 of a process to encrypt the vertices of a distributed graph in order to compute centrality metrics while preserving privacy for one embodiment of the invention. Certain operations of the process are represented by boxes with dashed lines to illustrate that they are optional. A plurality of subgraphs is distributed among a plurality of parties. Each party holds one or more different encryption keys of a commutatively encryption scheme. The process begins with encrypting the vertices of a first subgraph with a first encryption key $E_1(\ )$ of the commutatively encryption scheme at block 105. The encryption is preformed by a first party. The result is a set of encrypted vertices $E_1(v_A)$, where $v_A$ denotes a vertex of the first subgraph. At block 110, the vertices of the first subgraph may be further encrypted with a first additional encryption key $E_1'(\ )$. Then, the result is denoted as $E_1'(E_1(v_A))$ or $E_1(E_1'(v_A))$.

At block 115, vertices of a second subgraph are received encrypted with a second key $E_2(\ )$ from the commutative encryption scheme. These vertices are encrypted by a second party. The result is a set of encrypted vertices $E2(v_B)$, where $v_B$ denotes a vertex of the second subgraph. At block 120, the vertices of the second subgraph may be received encrypted also with a second additional encryption key: $E2'(E2(v_B))$. The first additional key and the second additional key may be keys from the commutative encryption scheme. At block 125, the received vertices of the second subgraph are commutatively encrypted with the first key by the first party. The result is a set of commutatively encrypted vertices $E_1(E2(v_B))$ or $E_1(E_2'(E_2(v_B)))$, respectively.

At block 130, the encrypted vertices of the first subgraph are sent to the second party. The commutatively encrypted vertices of the second subgraph may also being sent to the second party at block 135. At block 140, the vertices of the first subgraph are received after being commutatively encrypted with the second key by the second party: $E_2(E_1(v_A))$ or $E_2(E_1'(E_1(v_A)))$, respectively.

In an embodiment of the invention, the encrypted vertices are received or sent in tuples. A tuple represents an edge of the graph and is denoted as $(E(v), E(v'))$, where v and v' are two vertices of the graph connected by an edge. The tuples provide additional information about the structure of the graph and are not used when a higher privacy is required.

When the vertices of the first subgraph are commutatively encrypted with the first additional key $E_1'(\ )$, they are decrypted at block 145: $D_1'(E_2(E_1'(E1(v_A))))=E_2(E_1(v_A))$. Due to the commutative property of the encryption, the order of decryption does not need to repeat the order of encryption. At this point, the first party holds a set of vertices of the first subgraph, commutatively encrypted with a first and a second key $[E_2(E_1(v_A))]$. This set of commutatively encrypted vertices might include all vertices of the first subgraph. The first party also holds a set of vertices of the second subgraph, commutatively encrypted with a first and a second key: $[E_1(E_2(v_B))]$ or $[E_1(E_2'(E_2(v_B)))]$. When the vertices of the second subgraph are not encrypted with additional key, the two sets of vertices will be comparable for overlaps. Similarly, the second party holds a set of vertices of the second subgraph, commutatively encrypted with a second and a first key $[E_1(E_2(v_B))]$. The sets of encrypted vertices are persisted at block 150.

The process of flowchart 100 is illustrated with two subgraphs, but it will be evident to one skilled in the art that such a process could include more than two subgraphs. Thus, a party i (i=1, . . . , n) holds a set of vertices of the relevant subgraph commutatively encrypted with n keys $E_1(E_2(\ldots E_n(v) \ldots))$. The multiple commutative encryption of the vertices with n encryption keys is denoted as $E''(v)$. Since a commutatively encryption scheme is applied, the order of encryption is not important as long as all encryption keys are used.

In one embodiment of the invention, when the vertices are exchanged in tuples and no additional encryption keys are used, a party will hold a set of tuples for all commutatively encrypted vertices and edges of the graph: $E''(v)$, $E''(v')$. At block 160 these tuples may be used for building an anonymized graph, resembling the structure of the graph and preserving the privacy of the vertices. Each party keeps track of its own subgraph entries in the anonymized graph and could partially deanonymize the graph by replacing one or more of the commutatively encrypted vertices with the corresponding vertices of the relevant subgraph. Because of the semantic properties of the commutative encryption, the subgraph vertices could be tracked by the party in the entire anonymized graph.

In another embodiment of the invention, the exchanged vertices of the graph are encrypted with additional keys. Thus, a party i (i=1, . . . , n) holds a set of vertices of the graph commutatively encrypted with n keys $E_1(E_2(\ldots E_n(v_i) \ldots))$ only for its own graph i and doesn't have meaningful information for vertices of other subgraphs. The party cannot suggest the structure or the size of the graph, especially when the vertices are not exchanged in tuples. At block 155, centrality metrics of the graph are computed preserving any personally identifiable information or privacy data. The structure and the size of the graph are also preserved.

Figure 2A:
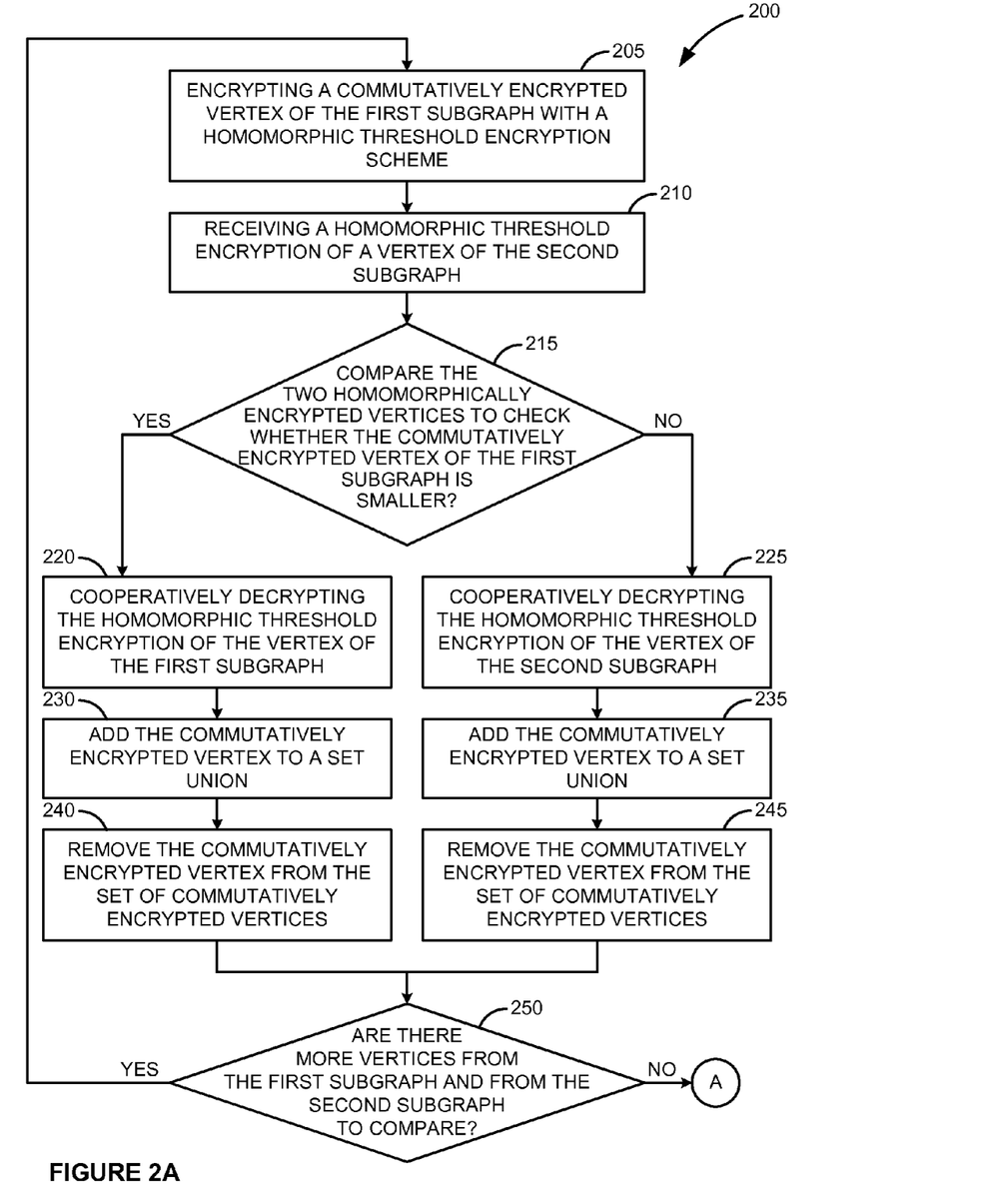
FIG. 2A illustrates a flowchart of a first part of a process to compute centrality metrics of a distributed graph while preserving the privacy of the graph and its size and structure according to one embodiment of the invention.

FIG. 2A is a flowchart 200 of a first part of a process to compute centrality metrics of a distributed graph for an embodiment of the invention. For this embodiment, the graph is distributed in subgraphs among n parties and party i (i=1, . . . , n) holds a set of commutatively encrypted vertices $E''(v_i)$ of the relevant subgraph i. Flowchart 200 illustrates the process with two subgraphs, but it is evident for one skilled in the art that such a process could include more than two subgraphs. At block 205, a commutatively encrypted vertex of the first subgraph is encrypted with a homomorphic threshold encryption scheme: $E^*(E''(v_1))$. At block 210, a commutatively encrypted vertex of a second subgraph is received. This vertex is further encrypted with the homomorphic threshold encryption scheme: $E^*(E''(v_2))$. The two homomorphicaly encrypted vertices are compared at block 215 and, depending on the result, one of the vertices is cooperatively decrypted to $E''(V_1)$ at block 220, or to $E''(v_2)$ at block 225 with a threshold decryption protocol $D^*(\ )$ by a required number of parties.

The decrypted vertex is still commutatively encrypted and is added to a set union at block 230 or at block 235, respectively. Then, in order to avoid duplicates from overlaps, the decrypted vertex is removed from the sets of commutatively encrypted vertices of all parties at block 240 or at block 245.

Blocks 205 through 245 repeat to compare each commutatively encrypted vertex from the first subgraph with each received commutatively encrypted vertex from the second subgraph. At block 250, it is determined if there are any vertices left to compare. When the sets of commutatively encrypted vertices of the first and second subgraphs are empty, the set union contains all commutatively encrypted vertices of the subgraphs. When applied to all n parties, the set union contains the commutative encryptions of all vertices of the graph. In one embodiment of the invention, each party may pad its set of commutatively encrypted vertices with random values in order to preserve the privacy of the size of the relevant subgraph.

Figure 2B:
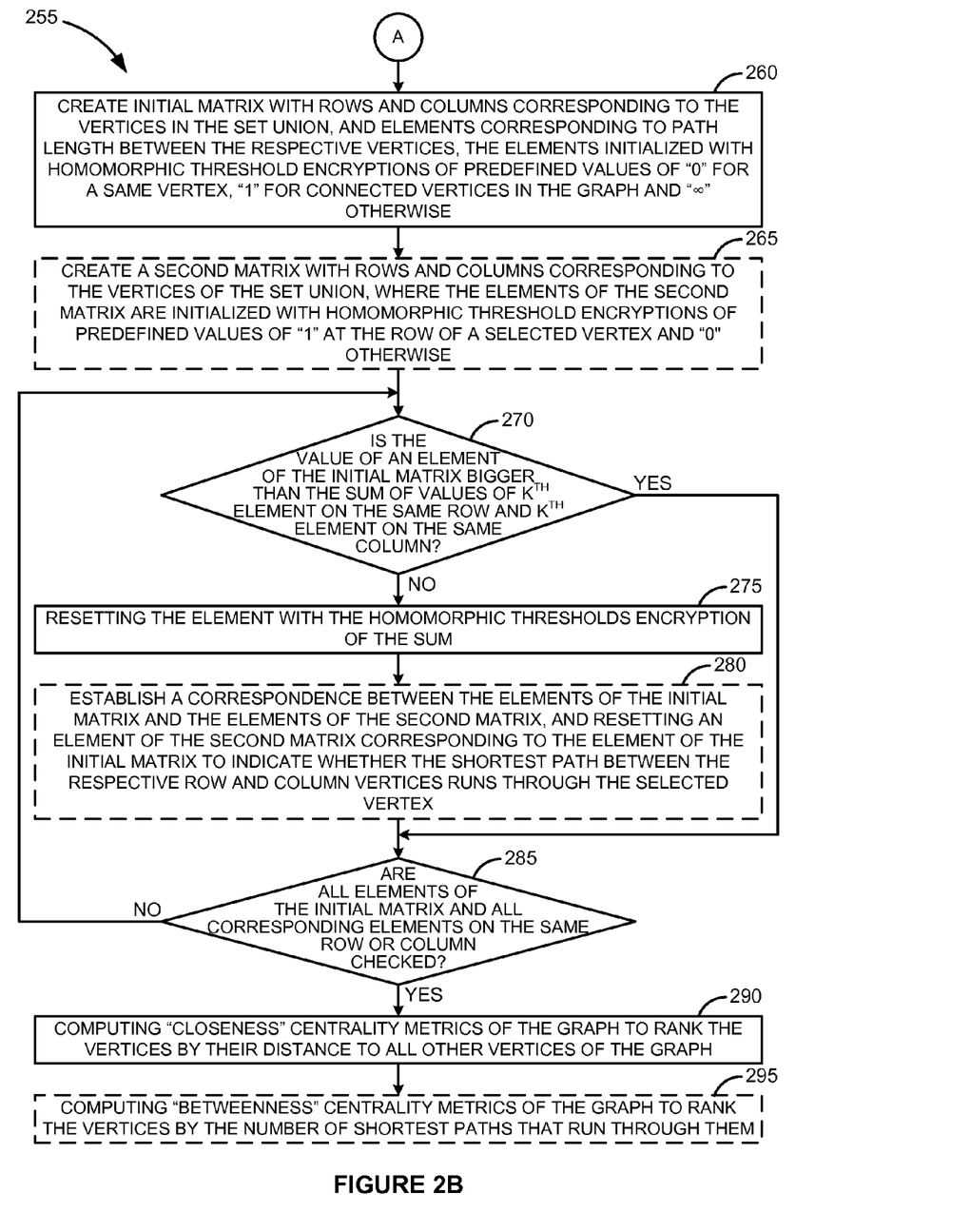
FIG. 2B is a continuation of FIG. 2A and illustrates a flowchart of a second part of a process to compute centrality metrics of a distributed graph while preserving the privacy of the graph and its size and structure according to one embodiment of the invention.

FIG. 2B is a continuation of FIG. 2A and is a flowchart 255 of a second part of a process to compute centrality metrics of a distributed graph for an embodiment of the invention. Certain operations of the process are represented by boxes with dashed lines to illustrate that they are optional. A set union of all vertices of the graph is necessary for calculating the shortest paths between each pair of vertices. At block 260, a square matrix M with a dimension corresponding to the number of elements in the set union is created. The rows and the columns of the matrix are labeled with the elements of the set union to fix the correspondence. Thus, each element of the matrix $M_{i,j}$ at row i and column j (i,j=1, . . . ,m, where m is the number of vertices in the set union) relates the $i^{th}$ vertex of the set union with the $j^{th}$ vertex of the set union. The matrix is initiated with homomorphic threshold encryptions of values as follows:

$E^*(M_{i,j})=E^*(0)$, when $i=j$, $E^*(M_{i,j})=E^*(1)$, when $i^{th}$ and $j^{th}$ vertex are connected by and edge $e=(v_i, v_j)$, $E^*(M_{i,j})=E^*(\infty)$ otherwise At block 265, a second square matrix T may be created. The second matrix has the structure of the initial matrix and its elements are initialized for a selected vertex $v_s$ from the set union as follows:

$E^*(T_{s,j})=E^*(1)$ when $j \neq s$ and $s^{th}$ vertex of the set union;

$E^*(T_{i,j})=E^*(0)$ otherwise

The process of flowchart 255 continues at block 270 by comparing each of the elements of the matrix $M_{ij}$ with the sum of any two of the elements of the matrix: $M_{ik} + M_{kj}$. The addition of plain values is computed by the multiplication of the cipher values due to their homomorphic property. The element $E^*(M_{ij})$ is replaced with $E^*(M_{ik}+M_{kj})$ when the sum is smaller at 275. Blocks 270 through 285 iterate until, at block 285, is confirmed that each element of the matrix is compared with each sum of two elements of the matrix. In one embodiment of the invention, blocks 270 through 285 form a calculation loop representing a dynamic programming method for computing all pairs shortest path. An example for such method is Floyd-Warshall algorithm.

At block 280, a correspondence between the elements of the initial matrix and the elements of the second matrix is established, if the second matrix is created. The element $E^*(T_{ij})$ of the second matrix is replaced with the sum $E^*(T_{ik}+T_{kj})$, when the sum of $M_{ik}+M_{kj}$ is smaller than $M_{ij}$. In one embodiment of the invention, for each iteration, the relevant rows of the initial matrix are augmented with the corresponding elements of the second matrix, e.g. the row of $M_{ij}$ is augmented with field $E^*(T_{ij})$ and the row of $M_{ik}+M_{kj}$ is augmented with field $E^*(T_{ik}+T_{kj})$. Element $T_{ij}$ in the second matrix is updated with the value from the augmented field in the minimum row. At the end, $E^*(T_{ij})$ equals $E^*(1)$ if the path from $v_i$ to $v_j$ is via $v_s$, otherwise $E^*(T_{ij})$ equals $E^*(0)$. From the computation of $T_{ij}$ during the iterations, it follows that it is an invariant of the algorithm that $T_{ij}$ equals the number of times the path from $v_i$ to $v_j$ crosses $v_s$ as an intermediary vertex. Since the algorithm computes the shortest path at its completion, no path can cross $v_s$ more than one time in the final matrix T.

If at block 285, all the elements have not been processed, then the processing continues at block 270. If all the elements have been processed, the process continues at block 290 to compute a centrality metrics of the graph. The initial matrix contains the homomorphic threshold encryptions of the shortest paths between each pair of vertices of the graph. The centrality metrics uses the length of the shortest paths from a selected vertex $v_s$ to each of the rest of the vertices in the graph $v_i$ denoted as $\delta(v_s, v_i)$ where i=1, . . . , m and i≠s. Such a centrality metrics is "closeness" $C_C(\ )$. It ranks vertices by their distance to all other nodes in a graph. Vertices with a high "closeness" may indicate leadership in an organization. "Closeness" of a selected vertex $v_s$ is calculated as follows:

$$C_C(v_s) = \sum_{i=1}^{m} \frac{|m|-1}{\delta(v_s, v_i)}$$

From the initial matrix $E^*(c_C(v_s))$ is evaluated as a homomorphic encryption of a sum of the length of all shortest paths from $v_s$ to $v_i$:

$$E^*(c_C(v_s)) = \prod_{i=1}^{m} E^*(M_{si}) = E^*\left(\sum_{i=1}^{m} \delta(v_s, v_i)\right)$$

Then, $E^*(c_C(v_s))$ could be randomized to $\hat{E}^*(c_C(v_s))$ and sent to as many parties as required by the threshold decryption protocol. The plain value $c_C(v_s)$ is used for calculating "closeness" of vertex $v_s$:

$$C_C(v_s) = \frac{|m|-1}{D^*(\hat{E}^*(c_C(v_s)))}$$

At block 295, a second type of centrality metrics of the graph may be computed using the number of shortest paths between vertices running through a selected vertex $v_s$ denoted as $\sigma_s(v_i, v_j)$. Such a centrality metrics is "betweenness" $C_B(\ )$. It ranks vertices by the number of shortest paths that run through them and identifies vertices which connect strongly connected components. Vertices with a high "betweenness" indicate gatekeeper functionality between two organizations. "Betweenness" of a selected vertex $v_s$ is calculated as follows:

$$C_B(v_s) = \sum_{\substack{i=1 \\ j=1 \\ i \neq j, i \neq s, j \neq s}}^{m} \frac{\sigma_s(v_i, v_j)}{(|m|-1)*(|m|-2)}$$

From the second matrix $E^*(c_B(v_s))$ is evaluated as a homomorphic encryption of a sum of the values of the second matrix, incrementally indicating the number of the shortest paths running through vertex $v_s$:

$$E^*(c_B(v_s)) = \sum_{\substack{i=1 \\ j=1 \\ i \neq j, i \neq s, j \neq s}}^{m} E^*(T_{ij}) = E^*\left(\sum_{\substack{i=1 \\ j=1 \\ i \neq j, i \neq s, j \neq s}}^{m} \sigma_s(v_i, v_j)\right)$$

Then, $E^*(c_B(v_s))$ could be randomized to $\hat{E}^*(c_B(v_s))$ and sent to as many parties as required by the threshold decryption protocol. The decrypted plain value $c_B(v_s)$ is used for calculating betweenness of vertex $v_s$:

$$C_B(v_s) = \frac{D^*(\hat{E}^*(c_B(v_s)))}{(|m|-1)^*(|m|-2)}$$

The flowchart 200 includes block 220 and block 270 where two homomorphicaly encrypted input values are compared. This comparison is accomplished without decrypting the values. In one embodiment of the invention a privacy preserving minimum protocol is applied for comparing two values encrypted with a homomorphic threshold encryption scheme. Such a protocol is executed by at least as many parties as required by a threshold decryption protocol.

Figure 3A:
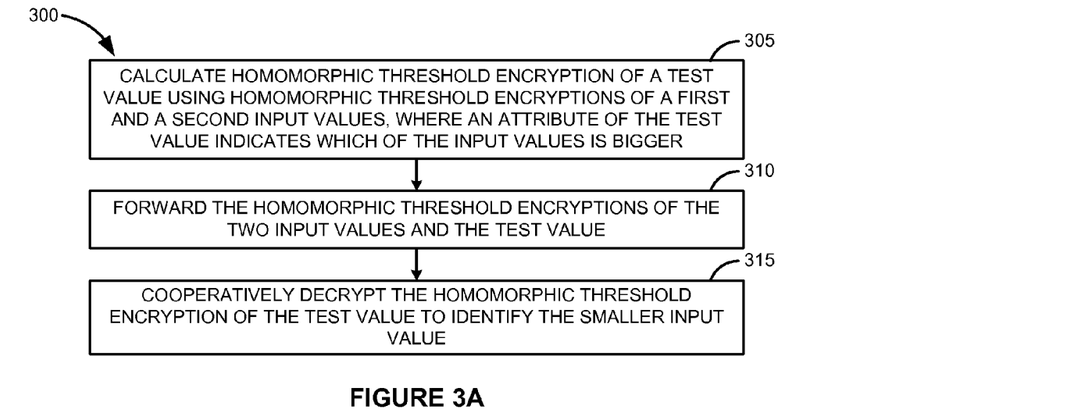
FIG. 3A illustrates a flowchart of a process for comparing input values applying a privacy preserving minimum protocol according to one embodiment of the invention.

FIG. 3A is a flowchart 300 of a process for comparing input values applying a privacy preserving minimum protocol by a first party, according to one embodiment of the invention. At block 305, the first party calculates a homomorphic threshold encryption of a test value $E^*(c)$ from a homomorphic threshold encryptions of a first input value $E^*(x_1)$ and a homomorphic threshold encryptions of a second input value $E^*(x_2)$. An attribute of the test value indicates whether the first input value is bigger than the second input value. In an example embodiment such an attribute is the sign, and the test value is calculated with the following formula:

$$E^*(c) = (E^*(x_1)^* E^*(-x_2))^{r^*} E^*(-r'),$$

$$E^*(c) = E^*(r^*(x_1-x_2)-r'),$$

where r and r' are random values, r is a very large value to multiplicatively hide any input value, and r' is a smaller value. According to the properties of the homomorphic encryption, the negation of a plain value is computed by computing the multiplicative inverse of the cipher value.

At block 310, the first party forwards the homomorphic threshold encryptions of the input values and the homomorphic threshold encryptions of the test value to a second party. When the test value is forwarded to the predefined number of parties, the parties collaborate in decrypting the test value $D^*(E^*(c))$ at 315. If c is a positive value, $x_1$ is bigger than $x_2$. Respectively, if c is a negative value, $x_2$ is bigger than $x_1$.

Figure 3B:
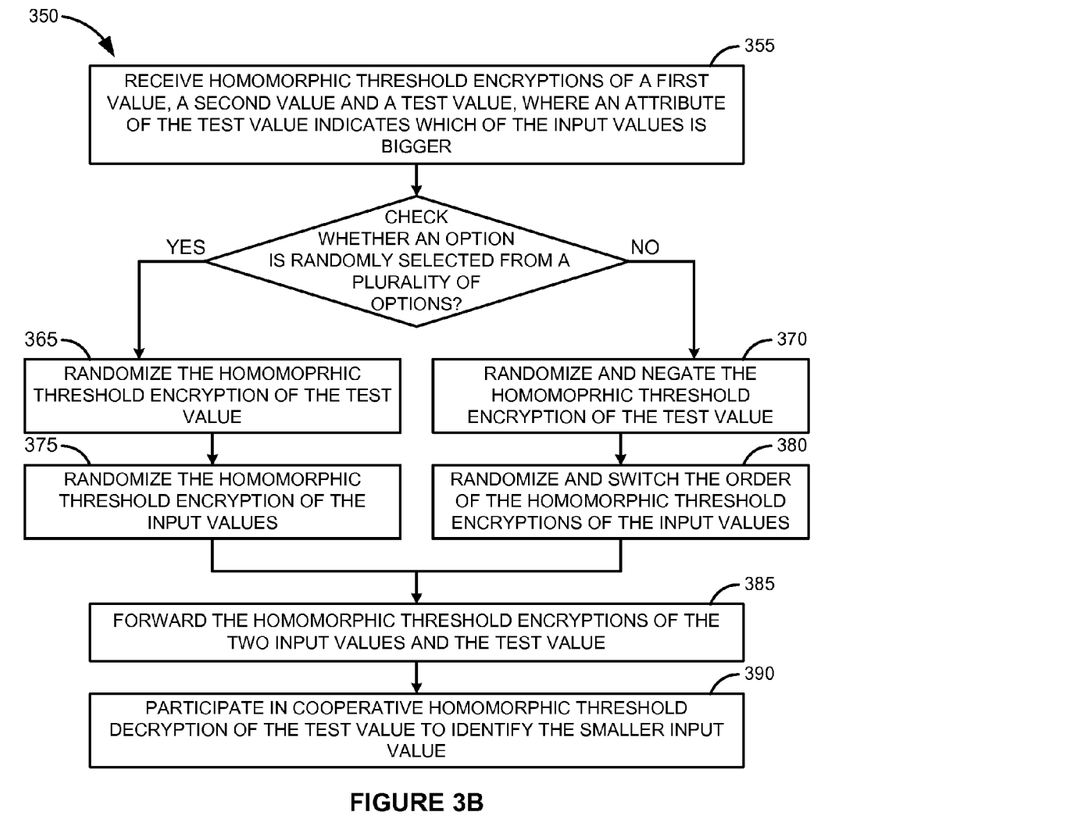
FIG. 3B illustrates a flowchart of a process for comparing input values applying a privacy preserving minimum protocol according to one embodiment of the invention.

FIG. 3B is a flowchart 350 of a process for comparing input values applying a privacy preserving minimum protocol by a second party, according to one embodiment of the invention. At block 355, the second party receives a homomorphic threshold encryption of a first input value, a homomorphic threshold encryption of a second value and a homomorphic threshold encryption of a test value. An attribute of the test value indicates whether the first input value is bigger than the second input value. In the example embodiment of the invention, such an attribute is the sign.

At block 360, a random choice of one option from a plurality of options is performed. The random choice may involve flipping a coin method. Depending on the chosen option, the test value is randomized at block 365 or at block 370. In the example embodiment of the invention, the test value is randomized as follows:

$$E^*(r^*c-r'),$$

when the coin is flipped on its back, or $$E^*(-r^*c+r'),$$

when the coin is flipped on its face, where r and r' are random values, r is a very large value to multiplicatively hide an input value, and r' is a smaller value.

At block 375, the second party randomizes the homomorphic encryptions of the input values, or, at block 380, the second party randomizes the homomorphic encryptions of the input values and switch their order. The second party forwards the randomized input values and the randomized test value to a third party at block 385. When the test value is forwarded to a predefined number of parties, the parties collaborate in decrypting the test value $D^*(E^*(c))$ at block 390. If c is a positive value, $x_1$ is bigger than $x_2$. Respectively, if c is a negative value, X2 is bigger than $x_1$. The randomization of the test value, according to a random choice between options, prevents concluding which is the bigger input value from the order of receiving.

Figure 4:
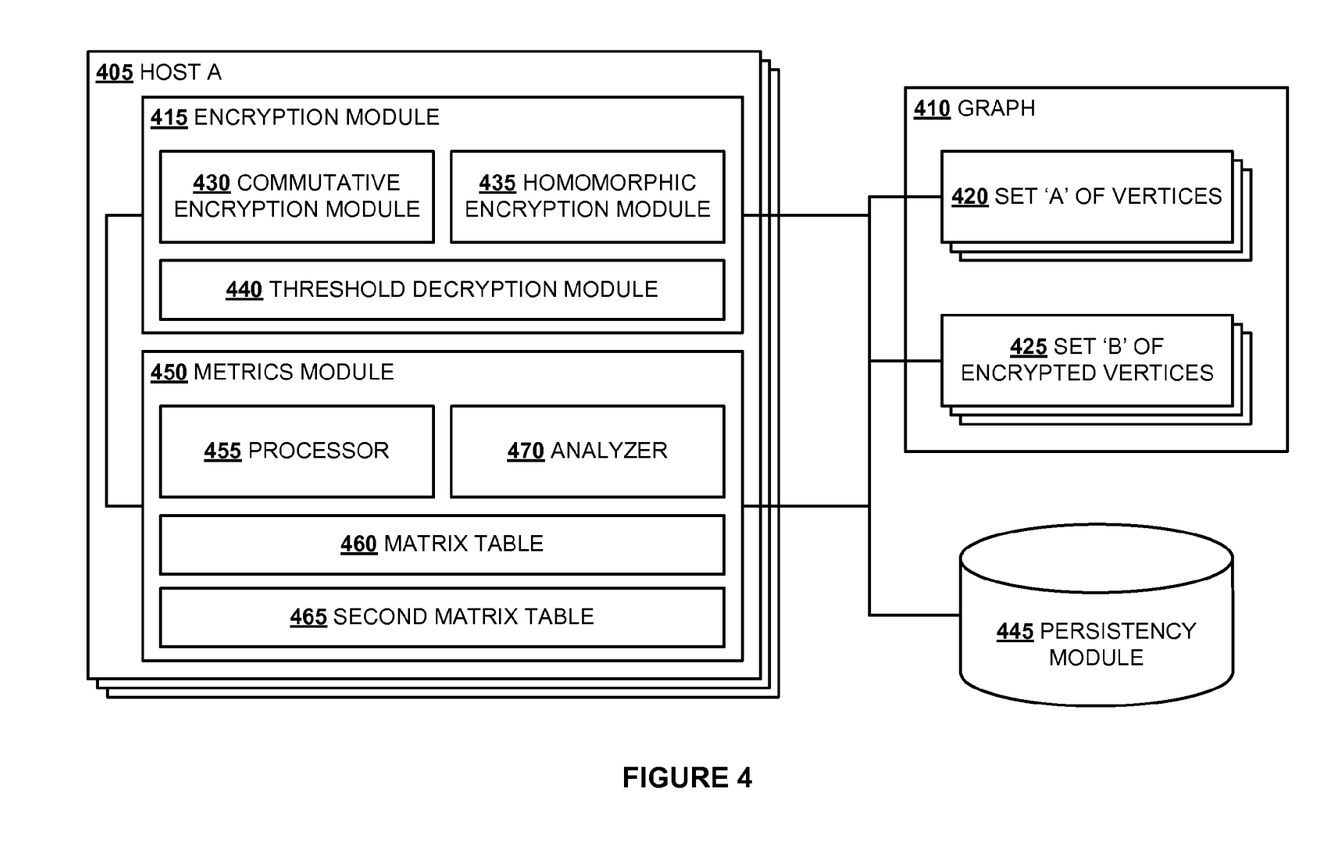
FIG. 4 illustrates a block diagram of a system to compute centrality metrics of a distributed graph while preserving the privacy of the graph and its size and structure according to one embodiment of the invention.

FIG. 4 is a block diagram of a System 400 to compute centrality metrics of a distributed graph while preserving the privacy of the graph and its structure, according to one embodiment of the invention. System 400 may be a distributed system. In FIG. 4, only a single Host A 405 of System 400 is illustrated, however, it will be evident to one skilled in the art that a plurality of hosts may exist to resemble the structure of Host A 405, and to perform the same function in the terms of a distributed operating environment. Host A 405 has access to Set A 420 of vertices of Graph 410. Further, Host A 405 has access to Set B 425 of vertices of Graph 410 encrypted with a second key of a commutatively encrypting scheme. The vertices of Set B 425 may be further encrypted with a second additional key.

Host A 405 comprises Encryption Module 415 to encrypt and decrypt values. Encryption Module 415 comprises Commutative Encryption Module 430 to encrypt and decrypt the vertices of Set A 420 and the vertices of set B 425 with a first key of the commutatively encryption scheme. Commutative Encryption Module 430 may further encrypt and decrypt the vertices of Set A 420 with a first additional encryption key. Encryption Module 415 further comprises Homomorphic Encryption Module 435 to encrypt values applying a homomorphic threshold encryption. Encryption Module 415 further comprises Threshold Decryption Module 440 to participate in decryption of values encrypted with a homomorphic threshold encryption scheme. The encrypted vertices of Graph 410 are persisted in Persistency Module 445.

Host A 405 includes Metrics Module 450 to compute centrality metrics of Graph 410. In order to preserve the privacy, size and structure of Graph 410, Metrics Module 450 accesses the encrypted vertices in the persistence module. The Metrics Module 450 comprises Processor 455 to perform operations with a plurality of values encrypted by applying a homomorphic threshold scheme. In one embodiment of the invention, these operations may include arithmetic operations and string operations. Further, Metrics Module 450 comprises Matrix Table 460 to store homomorphic threshold encryptions of the shortest paths between the plurality of commutatively encrypted vertices. Metrics Module 450 may also comprise Second Matrix Table 465 to store values indicating whether the shortest paths run through a selected vertex.

Another element of Metrics Module 450 is Analyzer 470 to compute "closeness" centrality metric and rank a selected vertex by its distance to a plurality of vertices of Graph 410. Analyzer 470 further computes "betweenness" centrality metric to rank a selected vertex by a number of shortest paths running through it.

In the above description numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A computer implemented method for privacy preserving network analysis, the method comprising:
   encrypting at a first system by a microprocessor a plurality of vertices of a first subgraph of a graph with a first key of a commutatively encryption scheme, wherein the first system hosts the first subgraph of the graph;
   sending to a second system the plurality of vertices of the first subgraph encrypted with the first key, wherein the second system hosts a second subgraph of the graph;
   receiving at the first system a plurality of vertices of the second subgraph of the graph encrypted with a second key from the commutatively encryption scheme, and the plurality of vertices of the first subgraph encrypted with the first key and commutatively encrypted with the second key;
   commutatively encrypting at the first system by the microprocessor with the first key the plurality of vertices of the second subgraph encrypted with the second key;
   creating a first matrix with rows and columns corresponding to a union between the plurality of commutatively encrypted vertices of the first subgraph and the plurality of commutatively encrypted vertices of the second subgraph, wherein each element of the first matrix stores a homomorphic threshold encryption of path length in the graph between the corresponding pair of commutatively encrypted vertices of the union; and
   computing a centrality metric of the graph for a selected vertex based on the first matrix.

2. The method of claim 1 further comprising:
   persisting one or more of the commutatively encrypted vertices of the first subgraph and the commutatively encrypted vertices of the second subgraph in an external persistency module.

3. The method of claim 1 further comprising:
   encrypting the plurality of vertices of the first subgraph with a first additional key.

4. The method of claim 1, wherein receiving a plurality of vertices of the second subgraph comprises:
   receiving at the first system the plurality of vertices of the second subgraph of the graph encrypted with the second key and additionally encrypted with a second additional key.

5. The method of claim 1, wherein computing centrality metrics comprises:
   calculating a homomorphic threshold encryption of a shortest path between a pair of vertices commutatively encrypted with the first key and with the second key.

6. The method of claim 5, wherein calculating the shortest path comprises:
   applying a privacy preserving minimum protocol for comparing values Encrypted with a homomorphic threshold encryption scheme.

7. The method of claim 1, wherein creating the first matrix comprises:
   encrypting at the first system by the microprocessor with a homomorphic threshold encryption scheme a commutatively encrypted vertex of the first subgraph;
   receiving at the first system a homomorphic threshold encryption of a commutatively encrypted vertex of the second subgraph;
   participating in a multi-system cooperative homomorphic threshold decryption of the smaller of the two commutatively encrypted vertices; and
   adding the smaller commutatively encrypted vertex to the union.

8. The method of claim 6, wherein the applying a privacy preserving minimum protocol comprises:
   calculating a homomorphic threshold encryption of a test value using a homomorphic threshold encryption of a first input value and a homomorphic threshold encryption of a second input value, a property of the test value indicating which of the input values is bigger; and
   participating in a cooperative homomorphic threshold decryption of the test value to identify the smaller input value.

9. The method of claim 6, wherein the applying a privacy preserving minimum protocol comprises:
   receiving a homomorphic threshold encryption of a first input value, a homomorphic threshold encryption of a second input value and a homomorphic threshold encryption of a test value, a property of the test value indicating which of the input values is bigger;
   randomizing the homomorphic threshold encryption of the test value in accordance with a random choice of an option from a plurality of options; and
   participating in a cooperative homomorphic threshold decryption of the test value to identify the smaller input value.

10. The method of claim 1, wherein computing centrality metrics comprises:
    ranking the selected vertex of the union between the plurality of commutatively encrypted vertices of the first subgraph and the plurality of commutatively encrypted vertices of the second subgraph by a number of shortest paths between vertices of the union running through it.

11. The method of claim 10 further comprising:
    creating a second matrix with rows and columns corresponding to the union between the plurality of commutatively encrypted vertices of the first subgraph and the plurality of commutatively encrypted vertices of the second subgraph; and
    resetting an element of the second matrix on a row corresponding to a first vertex and a column corresponding to a second vertex to a homomorphic threshold encryption of a value indicating whether a shortest path between the two vertices runs through the selected vertex.

12. The method of claim 11 further comprising:
    linking a row of the first matrix with an element of the second matrix; and resetting the linked element to a homomorphic threshold encryption of a value indicating whether a shortest path from the row of the first matrix runs through the selected vertex.

13. The method of claim 1, wherein computing centrality metrics comprises:
ranking the selected vertex of the union between the plurality of commutatively encrypted vertices of the first subgraph and the plurality of commutatively encrypted vertices of the second subgraph by its distance to a plurality of vertices of the union.

14. The method of claim 1, wherein computing centrality metrics comprises:
calculating a homomorphic threshold encryption of a sum of a plurality of elements of the first matrix; and
participating in a cooperative homomorphic threshold decryption of the sum in order to reveal a property of the selected vertex.

15. A computer system for privacy preserving network analysis, the system comprising:
a hardware memory to store computer executable instructions; and
a hardware microprocessor coupled to the memory and configured by the instructions to:
encrypt a plurality of vertices of a first subgraph of a graph with a first key of a commutatively encryption scheme,
send to an external computer system the plurality of vertices of the first subgraph encrypted with the first key,
receive a plurality of vertices of a second subgraph of the graph encrypted with a second key from the commutatively encryption scheme, and the plurality of vertices of the first subgraph encrypted with the first key and commutatively encrypted with the second key,
commutatively encrypt with the first key the plurality of vertices of the second subgraph encrypted with the second key,
create a first matrix with rows and columns corresponding to a union between the plurality of commutatively encrypted vertices of the first subgraph and the plurality of commutatively encrypted vertices of the second subgraph, wherein each element of the first matrix stores a homomorphic threshold encryption of path length in the graph between the corresponding pair of commutatively encrypted vertices of the union,
compute a centrality metric of the graph for a selected vertex based on the first matrix.

16. The system of claim 15, wherein the microprocessor is further configured to:
store the plurality of encrypted vertices of the first subgraph and of the second subgraph.

17. The system of claim 15, wherein the microprocessor is further configured to:
encrypt and decrypt a plurality of vertices of the first subgraph with one or more of the first key and a first additional key.

18. The system of claim 15, wherein the microprocessor is further configured to:
encrypt a value with a homomorphic threshold encryption scheme; and
participate in decryption of a value, encrypted with the homomorphic threshold encryption scheme.

19. The system of claim 15, wherein the microprocessor is further configured to:
create a second matrix with rows and columns corresponding to the union between encrypted vertices of the first subgraph and the encrypted vertices of the second subgraph, wherein each element of the second matrix stores values indicating whether a shortest path between a corresponding pair of vertices run through the selected vertex.

20. The system of claim 15, wherein the microprocessor is further configured to:
rank the selected vertex by one of its distance to a plurality of vertices, or a number of shortest paths running through it.

* * * * *